United States Patent
Zeller et al.

(10) Patent No.: US 6,540,809 B1
(45) Date of Patent: *Apr. 1, 2003

(54) METHOD FOR FORMING CHROMIUM ANISOTROPIC METAL PARTICLES

(75) Inventors: Robert S. Zeller, Boston, MA (US); Christopher J. Vroman, Natick, MA (US)

(73) Assignee: Mykrolis Corporation, Billerica, MA (US)

( * ) Notice: Subject to any disclaimer, the term of this patent is extended or adjusted under 35 U.S.C. 154(b) by 20 days.

This patent is subject to a terminal disclaimer.

(21) Appl. No.: 09/724,147

(22) Filed: Nov. 28, 2000

Related U.S. Application Data

(60) Continuation of application No. 09/168,795, filed on Oct. 8, 1998, now Pat. No. 6,193,778, which is a division of application No. 08/820,762, filed on Mar. 19, 1997, now abandoned, which is a division of application No. 08/604,811, filed on Feb. 21, 1996, now Pat. No. 5,814,272.

(51) Int. Cl.$^7$ .............................................. C22C 27/06
(52) U.S. Cl. .......................... 75/255; 148/423; 420/428
(58) Field of Search .................. 75/245, 255; 420/428; 148/423; 423/53, 61

(56) References Cited

U.S. PATENT DOCUMENTS

| | | |
|---|---|---|
| 3,933,652 A | 1/1976 | Weichselbaum et al. .... 210/446 |
| 4,163,075 A | 7/1979 | Nakano et al. ............. 428/328 |
| 4,297,135 A | 10/1981 | Giessen et al. ........... 75/123 B |
| 4,464,206 A | 8/1984 | Kumar et al. ........... 148/11.5 P |
| 4,555,317 A | 11/1985 | Nicolas et al. ............... 204/129 |
| 4,562,039 A | 12/1985 | Koehler .......................... 419/2 |
| 4,668,290 A | 5/1987 | Wang et al. .................. 75/235 |
| 4,710,346 A | 12/1987 | Rossman ..................... 419/68 |
| 4,891,068 A * | 1/1990 | Masumoto et al. ........... 75/251 |
| 5,069,867 A | 12/1991 | Zengin ......................... 419/15 |
| 5,487,771 A | 1/1996 | Zeller .......................... 55/523 |
| 6,193,778 B1 * | 2/2001 | Zeller et al. ................... 75/245 |

FOREIGN PATENT DOCUMENTS

| | | |
|---|---|---|
| GB | 829640 | 3/1962 |
| GB | 2 074 609 | 11/1981 |
| GB | 2 084 612 | 4/1982 |

OTHER PUBLICATIONS

German, R.M., "Chapter 7—Sintering.", In *Powder Metallurgy Science* $2^{nd}$ *Edition* New Jersey: Metal Powder Industries Federation), pp. 241–263 (1994).

Taubenblat, P.W., et al., "Electrodeposition of Metal Powders;" "Production of Iron Powder;" "Production of Copper Powder;" and "Production of Nickel and Nickel Alloy Powders." In *Metals Handbook* $9^{th}$ *Edition* vol. 7—*Powder Metallurgy* (Ohio: American Society for Metals), pp. 71–72, 79–99, 105–120, 134–143 (1984).

* cited by examiner

*Primary Examiner*—George Wyszomierski
(74) *Attorney, Agent, or Firm*—Hamilton, Brook, Smith & Reynolds, P.C.

(57) ABSTRACT

A method for forming dendritic metal powders, comprising the steps of: (1) heating a powder comprising non-dendritic particles, under conditions suitable for initial stage sintering, to form a lightly sintered material; and (2) breaking the lightly sintered material to form a powder comprising dendritic particles. In one embodiment, the lightly sintered material is broken by brushing the material through a screen. Another aspect of the present invention comprises the dendritic particles that are produced by the method described above. These particles can comprise any suitable metal, such as transition metals, rare earth metals, main group metals or metalloids or an alloy of two or more such metals. The particles can also comprise a ceramic material, such as a metal oxide. These particles are characterized by a dendritic, highly anisotropic, morphology arising from the fusion of substantially non-dendritic particles, and by a low apparent density relative to the substantially non-dendritic starting material. The present dendritic particles can be of high purity, and substantially free of carbon contamination.

5 Claims, 6 Drawing Sheets

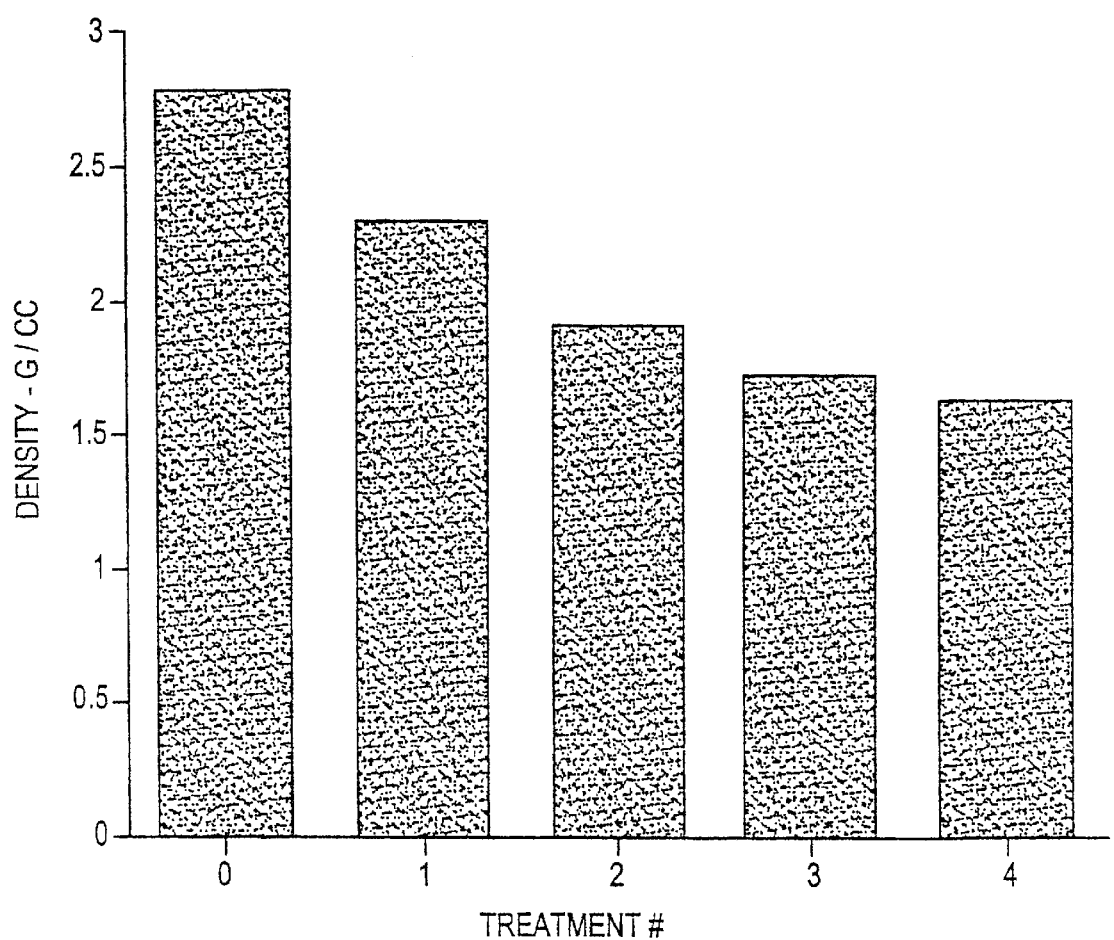

METHOD FOR FORMING CHROMIUM ANISOTROPIC METAL PARTICLES

RELATED APPLICATIONS

This application is a Continuation of Ser. No. 09/168,795, filed on Oct. 8, 1998 (U.S. Pat. No. 6,193,778), which is a Divisional of Ser. No. 08/820,762, filed on Mar. 19, 1997 (abandoned), which is a Divisional of Ser. No. 08/604,811, filed on Feb. 21, 1996 (U.S. Pat. No. 5,814,272), the entire teachings of which are incorporated herein by reference.

BACKGROUND OF THE INVENTION

Metal powders are common starting materials for the fabrication of metallic structures. Such structures are typically made by packing the metal powder into a mold, then sintering the shaped powder to form a continuous structure with the desired mechanical properties. The properties of the final structure depend strongly upon the morphology of the starting powder particles. The particle morphology, for example, determines the packing efficiency of the particles, and, hence, the density and porosity of the final structure.

Dendritic or filamentary powders of nickel and iron are commercially available, for example, INCO® Filamentary Nickel Powder, Type 287 (International Nickel Company, Inc., Saddle Brook, N.J.). There are, however, no commercially available dendritic powders of metals other than iron, nickel and copper. Powders of most metals can be formed by atomization, which typically yields substantially non-dendritic powder particles. Electrodeposition is used to prepare powders of iron, copper and silver. These powders can be dendritic, but are expensive to produce and incorporate impurities derived from the anion present in the starting material (Taubenblat in Powder Metallurgy, Volume 7 of Metals Handbook, Ninth Edition, American Society of Metals, Metals Park, Ohio). Powders of metallic nickel and iron can also be formed by thermal decomposition of the highly toxic organometallic compounds nickel tetracarbonyl and iron pentacarbonyl, respectively. Depending upon the details of this process, the resulting powders have morphologies which are either substantially spherical or filamentary.

Dendritic particles of many metals and alloys, however, cannot be formed by metal carbonyl decomposition. Unlike nickel tetracarbonyl and iron pentacarbonyl, other binary metal carbonyl compounds do not thermally decompose to form elemental metal and carbon monoxide. Moreover, for certain metals, such as the main group metals, platinum, palladium and the rare earth metals (lanthanides and actinides), binary carbonyl compounds are unknown (Cotton et al., Advanced Inorganic Chemistry, Wiley: New York, 1021–1051 (1987)). In addition, formation of a metal alloy powder via decomposition of a molecular precursor requires that the precursor contain the desired metals in the desired proportions, in order to achieve the intimate mixing, on the atomic scale, required of a solid solution, such as an alloy. Certain bimetallic carbonyl compounds are known, but they are generally difficult to produce in macroscopic quantities and none are known to form alloys upon decomposition (Cotton et al. (1987), supra). Furthermore, the method by which the filamentary nickel and iron powders are prepared is not applicable to other substantially pure metals and alloys. This method also yields products with a substantial carbon impurity, particularly in the case of iron.

There is a need for metal membrane filter elements, for a variety of applications, fabricated of a variety of metal powders, including dendritic or filamentary powders, and with increased purity. This is particularly true when nickel and iron are incompatible with a potential application of the device. For example, such filters could be employed to purify gases used in semiconductor manufacturing. In this application, however, nickel would be disadvantageous, as it catalyzes the decomposition of certain hydridic reagents frequently used in semiconductor synthesis, such as phosphine, arsine and diborane.

Thus, the need exists for dendritic powders of metals and metal-containing materials beyond those currently available. The limitations of previously known methods for the production of dendritic metal powders indicate that this need can be met via the development of new methods for the formation of such powders.

SUMMARY OF THE INVENTION

The present invention relates to a method for forming dendritic metal particles, comprising the steps of: (1) heating a powder comprising non-dendritic particles, under conditions suitable for the initial stage of sintering, to form a lightly sintered material; and (2) breaking the lightly sintered material to form a powder comprising dendritic particles. In one embodiment of the method, the powder comprising non-dendritic particles is spread or placed in a layer on a suitable substrate prior to heating. In another embodiment, the lightly sintered material is broken by brushing the material through a screen. In another embodiment, steps (1) and (2) above are repeated, in sequence, one or more times.

Another embodiment of the present invention includes the dendritic particles that can be formed by way of the method described above. These particles can comprise any suitable metal, such as a transition metal, a rare earth metal, a main group metal or metalloid or an alloy of two or more such metals. The particles can also comprise a ceramic material, such as a metal oxide. The particles produced by this method are characterized by a dendritic, highly anisotropic, morphology arising from the fusion of substantially non-dendritic particles, and by a low apparent density relative to the substantially non-dendritic starting material. The present dendritic particles can be of high purity, and substantially free of carbon contamination. An additional advantage of the present method is that it provides dendritic particles of metals, such as nickel and iron, without the use of highly toxic metal carbonyl precursors.

BRIEF DESCRIPTION OF THE DRAWINGS

FIG. 4 is a graph showing changes in the density of 316L stainless steel powder after two successive initial stage sintering/breaking cycles.

DETAILED DESCRIPTION OF THE INVENTION

Figure 1:
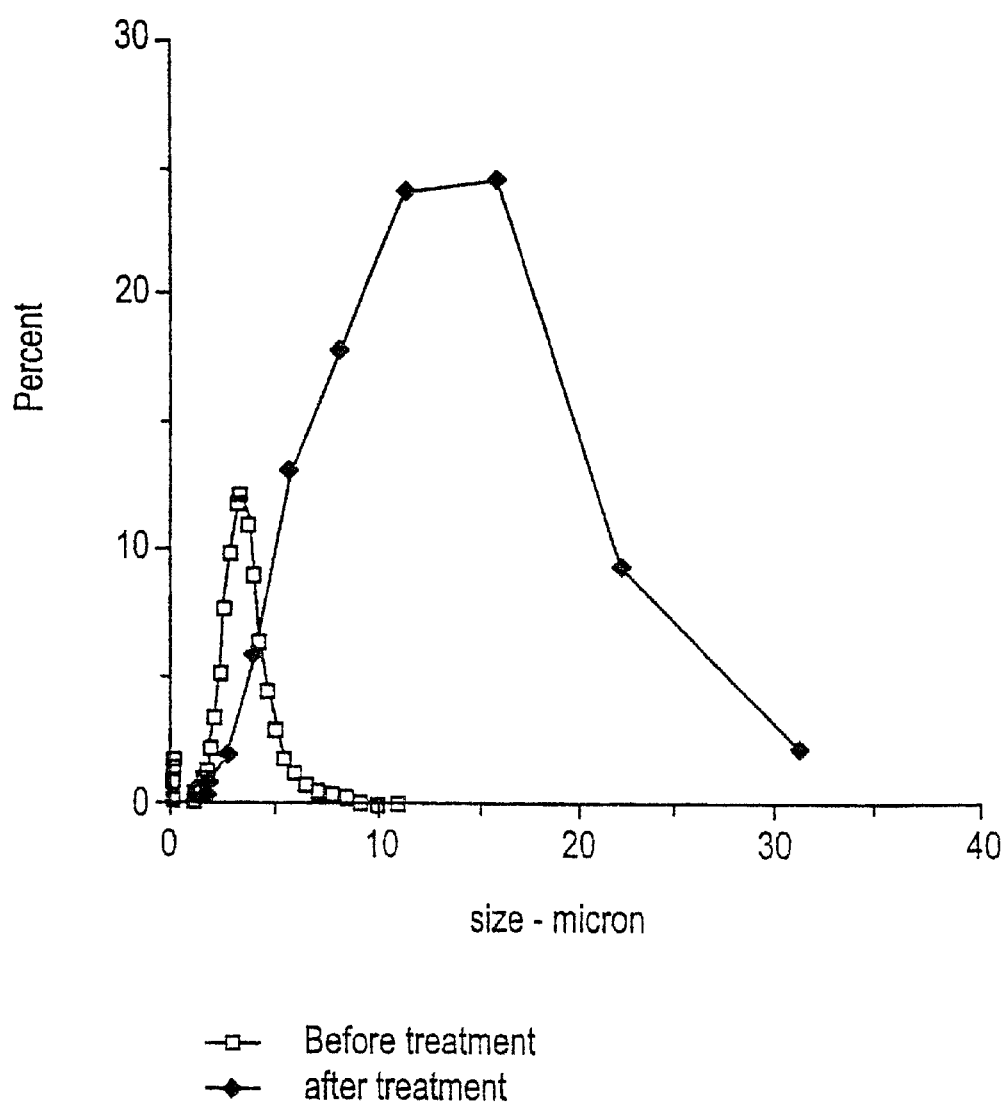
FIG. 1 is a graph showing the size distribution of INCONEL® 625 powder particles as received from the manufacturer and after six initial stage sintering/breaking cycles.

The present invention relates to a method for forming dendritic metal particles. The method comprises the steps of: (1) heating a powder comprising non-dendritic particles, under conditions suitable for initial stage sintering, to form a lightly sintered, and, optionally, continuous material; and (2) breaking the lightly sintered, and, optionally, continuous material to form a powder comprising dendritic metal particles.

Another embodiment of the present invention includes the dendritic particles that are formed via the method of the present invention. These particles can comprise any suitable metal, including a transition metal, such as scandium, chromium, vanadium, Chromium, manganese, iron cobalt, nickel, copper or zinc, or a heavier congener of these metals; a rare earth metal, such as uranium, gadolinium, europium, samarium, ytterbium or another metal from the lanthanide and actinide series; a main group metal, such as lithium, beryllium and or a congener, aluminum, tin, lead, gallium, antimony, or indium; or a metalloid, such as boron, silicon, tellurium, germanium or arsenic. These particles can also comprise a monophasic or multiphasic solid solution of one or more of these metals in another, such as an alloy. In addition, the particles formed by the present method can comprise a ceramic material, such as a metal or metalloid oxide or a metal or metalloid nitride.

For the purposes of the present application, the term "dendritic" is intended to mean a highly anisotropic, irregular morphology comprising one or more filaments individually having one dimension substantially greater than the other two. The filaments can be straight or bent and can also be branched or unbranched. Dendritic particles are characterized by low packing efficiencies compared to particles of more regular morphology and, therefore, form powders of lower density than those formed by particles of more regular morphology. The dendritic particles of the present invention are formed by the fusion of the starting, substantially nondendritic, particles. Under magnification, the particles can appear as aggregates of the starting particles with a substantially dendritic morphology. Dendritic powders also form self-supporting green forms and sintered articles of lower density, and, thus, higher porosity, than powders of more regular morphology.

The term "substantially non-dendritic powder" refers to a powder comprising particles which typically have a non-dendritic morphology. Thus, these particles have at least two dimensions which are substantially equivalent, for example, with lengths of the same order of magnitude.

The term "lightly sintered material" is intended to mean a material created by the fusion of metal powder particles through the initial stage of sintering, as defined by Randall (Randall in "Powder Metallurgy Science", second edition, German, ed., Metal Powder Federation Industry (1994), the contents of which are incorporated herein by reference). In the initial stage of sintering, or short-range diffusional sintering, bonds form between particles at the particle contacts, resulting in the fusion of metal powder particles with their immediate neighbors only. Thus, the initial stage of sintering yields a brittle structure of low mechanical strength. For a given material, sintering proceeds slowly beyond this initial stage at temperatures at the lower end of the material's sintering range. For the purposes of the present invention the term "initial stage sintering" refers to the sintering of a powder under conditions in which sintering does not proceed substantially beyond the initial stage.

The term "air-laid density" as used herein is the measured density of a powder after it is sifted through a screen, and allowed to fall through the air into a mold or container of known volume. This method of measuring density is highly reproducible, such as for the dendritic powders of the type described herein.

The term "metal" as used herein refers to any metallic or metalloid chemical element or an alloy of two or more of these elements. Preferred metals include members of the transition metals, such as platinum, Chromium, nickel, and alloys, such as stainless steel and INCONEL® 625.

The term "ceramic" as used herein refers to any combination of one or more metallic or metalloid elements with one or more non-metallic main group elements, forming a non-molecular solid material, such as a metal or metalloid oxide or nitride. Examples include various silicates, tungsten trioxide, tantalum nitride, and silicon nitride.

The present method allows the production of dendritic metal powders that have heretofore been inaccessible, and with a purity limited only by the purity of available non-dendritic starting materials. Metal-containing materials formed by decomposition of an organometallic precursor generally incorporate carbon impurities. For example, the filamentary nickel powders marketed by International Nickel Company, Inc., such as INCO® Filamentary Nickel Powder, Type 287, have a stated typical purity of 99.6%, with a maximum specified carbon content of 0.25%. In contrast, powders formed by atomization can have higher purities. For example, a non-filamentary nickel powder marketed by Aldrich Chemical Company (Milwaukee, Wis.) has a stated purity of 99.999%. As the present method is carried out under relatively mild conditions of temperature and pressure, and can be carried out in an inert or reducing atmosphere, the chemical composition of the powder does not substantially change as a result of this process. Thus, the product dendritic powders have substantially the purity of the starting, substantially non-dendritic, powders. Use of the Aldrich nickel powder as the starting material in the present method, therefore, is expected to yield a dendritic nickel powder of substantially equivalent purity, a marked increase in purity over presently available filamentary or dendritic nickel powders.

The present method can, thus, provide dendritic particles substantially free of carbon contamination because it does not rely upon carbon-containing starting materials. The carbon content of the dendritic particles thus produced can be substantially less than 0.20%, depending upon the available non-dendritic powders of the material of interest.

The conditions, including temperature, at which the initial stage of sintering takes place depend upon the material of interest and can be readily determined by the person of ordinary skill in the art. The initial stage of sintering for a given material, generally and optimally, takes place at the lower end of the material's sintering temperature range; sintering moves beyond the initial stage only slowly under these conditions. The heating is preferably performed under vacuum (for example, at a pressure on the order of $10^{-6}$ torr), in an inert atmosphere such as helium, argon or dinitrogen, or in a reducing atmosphere, such as dihydrogen. In the two latter cases, the pressure is preferably between about 0–5 atmospheres or slightly higher, and, more preferably between 0 atmospheres and about 1.5 atmospheres. These conditions are preferred to avoid exposure of the metal particles to oxygen, which at elevated temperatures will react with many metals to form a metal oxide surface. A reducing atmosphere, such as dihydrogen, is capable of purifying the particles by removing contaminants such as oxygen, nitrogen, carbon and sulfur. Of course, where the desired material is a metal oxide, the atmosphere can comprise oxygen.

The duration of step (1), above, can be sufficient to effect initial stage sintering throughout the starting powder sample. The length of time necessary will depend upon the material of interest, the amount of powder being treated, the thickness of the powder sample, and the size of the metal particles.

In one embodiment, the powder comprising non-dendritic particles is spread or placed on a plate, or other suitable substrate, prior to heating, preferably in a uniform layer of thickness about two centimeters or less. This increases the uniformity of initial stage sintering throughout the sample.

In a further embodiment of the present invention, a sample of powder can be cycled through steps (1) and (2) of the method two or more times in succession. As used herein, the terms "cycle" and "initial stage sintering/breaking cycle" refer to the sequential completion of steps (1) and (2) of the method described above. As described in Examples 1 and 2, the density of a sample of powder decreases with each cycle of this process. Thus, with the nickel/Chromium/iron/molybdenum alloy powder INCONEL® 625 as the starting material, the air-laid density of the powder as purchased was 3.7 g/cm$^3$. After three initial stage sintering/breaking cycles, the air-laid density was 3.0 g/cm$^3$, and, after six cycles, the air-laid density was further reduced to 2.38 g/cm$^3$. In yet another embodiment, the lightly-sintered material of step (2) is broken by agitation, for example, by stirring. This step can be automated and carried out within the furnace using means known in the art.

The reduction in air-laid density following each of several successive initial stage sintering/breaking cycles is interpreted as indicating increased dendritic character of the powder particles with each cycle. Thus, the longer the dendritic powder particles and the greater the degree of branching, the lower the packing efficiency, and, hence, the density of the powder, is expected to be. This effect has been demonstrated for the INCO® (International Nickel Co.) filamentary nickel powders, where the lower density powders are composed of particles which are, on average, longer, thinner and more highly branched, while the higher density powders are composed of particles which are shorter and thicker. Thus, the present method enables the preparation of powders of different densities, with the density of a given powder dependent upon the number of initial stage sintering/breaking cycles used to prepare the powder. The method of the present invention, can, therefore, reduce the air-laid density of a metal powder starting material by at least about 20%, preferably about 30% and, more preferably, about 40%.

Materials suitable for this method include sinterable materials available as substantially non-dendritic powders. These include substantially pure metals from the alkali and alkaline earth families, the transition metals, main group metals such as aluminum, tin and lead, the rare earth metals (lanthanides and actinides) and metalloids, such as silicon, germanium and arsenic. Alloys can also be employed, as can ceramic materials, such as metal or metalloid oxides and metal or metalloid nitrides. The starting non-dendritic particles can be of any size, but, in a preferred embodiment have diameters on the order of 10 μm or less.

In a preferred embodiment, the lightly-sintered material is mechanically broken by brushing the material through a screen. The mesh size of this screen sets an upper limit for particle diameter. The powder comprising dendritic particles obtained in this way can be further sifted to remove particles smaller than a pre-determined size. In this way, a powder sample with a well-defined particle size range can be prepared.

Another aspect of the present invention comprises dendritic particles that are prepared by the method of the present invention. These include dendritic particles substantially comprising a single metallic or metalloid element, such as any member of the alkali metals, the alkaline earth metals, the transition metals, the main group metals or metalloids or the rare earth metals (i.e., the lanthanide or actinide metals). Also included are dendritic particles prepared by the method of the present invention comprising an alloy of two or more metals or metalloids from the foregoing groups of elements. In addition, the present invention encompasses dendritic particles prepared by the present method comprising a ceramic material, such as a metal or metalloid oxide, a metal or metalloid nitride, or a mixed metal, for example, ternary, oxide.

An additional embodiment of the present invention includes dendritic particles substantially comprising metallic or metalloid elements which are members of the alkali or alkaline earth metals, Groups 3–7, Group 9 or Groups 12–16, or the rare earth metals. Also included are dendritic particles comprising platinum, palladium, ruthenium, osmium, silver and gold. The present invention also encompasses dendritic particles comprising an alloy comprising two or more metallic elements. In addition, the present invention further includes dendritic particles comprising a ceramic material, such as a metal or metalloid oxide, a metal or metalloid nitride, or a mixed metal oxide.

The dendritic metal powders of the present invention have several advantages. As starting materials in the fabrication of the metal membrane filters described in U.S. Pat. No. 5,487,771, the contents of which are incorporated by reference in their entirety, they provide access to such high porosity filters compatible with a variety of chemical substances and conditions of use. For example, a sample of dendritic INCONEL® 625 powder, prepared as described in Example 1, was used as the starting material for the fabrication of such a metal membrane filter element. The green form intermediate had a density of 3.13 g/cm$^3$ (63% porous), while the final sintered article had a density of 3.44 g/cm$^3$ (60% porous). It is noteworthy that the treated powder yields a sintered article which is of lower density than the untreated INCONEL® 625 powder (3.7 g/cm$^3$). Thus, the treated powder provides a sintered article of lower density (and higher porosity) than can be attained with the untreated powder in the absence of a binding agent.

Due to their greater surface area relative to particles of more regular morphology, dendritic powders of metals and metal oxides that are useful as heterogeneous catalysts are expected to display enhanced activity relative to powders of the same materials with more regular morphologies. Also, dendritic powders are highly compressible and can form a self-supporting green form, the structure resulting from compression of a powder in a mold, prior to sintering. Such a green form can, thus, be sintered without its mold. This is advantageous because sintering a powder in a mold can lead to deformation of the mold, and contamination of the metal powder.

Treatment of a metal powder by one or more initial stage sintering/breaking cycles also yields a powder with improved flowability compared to the starting material. This is due to the increase in particle size resulting from the initial stage sintering/breaking cycle, which offsets the decrease in flowability generally observed when particle morphology is made more irregular. Thus, the powders of the present invention will be of use in applications in which powder flowability is important.

The invention will now be further and specifically described by the following examples.

EXAMPLES

Example 1

Preparation of a Dendritic Ni/Cr/Mo/Fe Alloy Powder

Material

INCONEL® 625 Ni/Cr/Mo/Fe alloy powder (−3 μm cut) was obtained from International Nickel Company, Inc. This powder, as received, had an air-laid density of 3.70 g/cm$^3$, while the density of non-powder solid INCONEL® 625 is 8.44 g/cm$^3$.

Method

A 200 g portion of INCONEL® 625 powder was placed on a molybdenum plate and lightly pressed with a similar top plate to form a uniform layer of approximately 2.0 cm thickness. The plate holding the powder was placed under vacuum (10$^{-6}$ torr) in a vacuum furnace. The temperature of the furnace was then increased at the rate of 25° C. per minute until the temperature reached 760° C. This temperature was maintained for 30 minutes, then the furnace was allowed to cool to room temperature, thereby obtaining a lightly sintered material. The lightly sintered powder was then placed on a screen with a sieve size of 100 μm and gently broken up into a powder by brushing it through the screen. The resulting powder was again lightly sintered as described above and the resulting material was broken into powder. A total of six initial stage sintering/breaking cycles were performed on this powder sample.

A sample of the powder prepared by the method outlined above was used to prepare a metal membrane filter element according to the procedure described in U.S. Pat. No. 5,487,771.

Results

Figure 2:
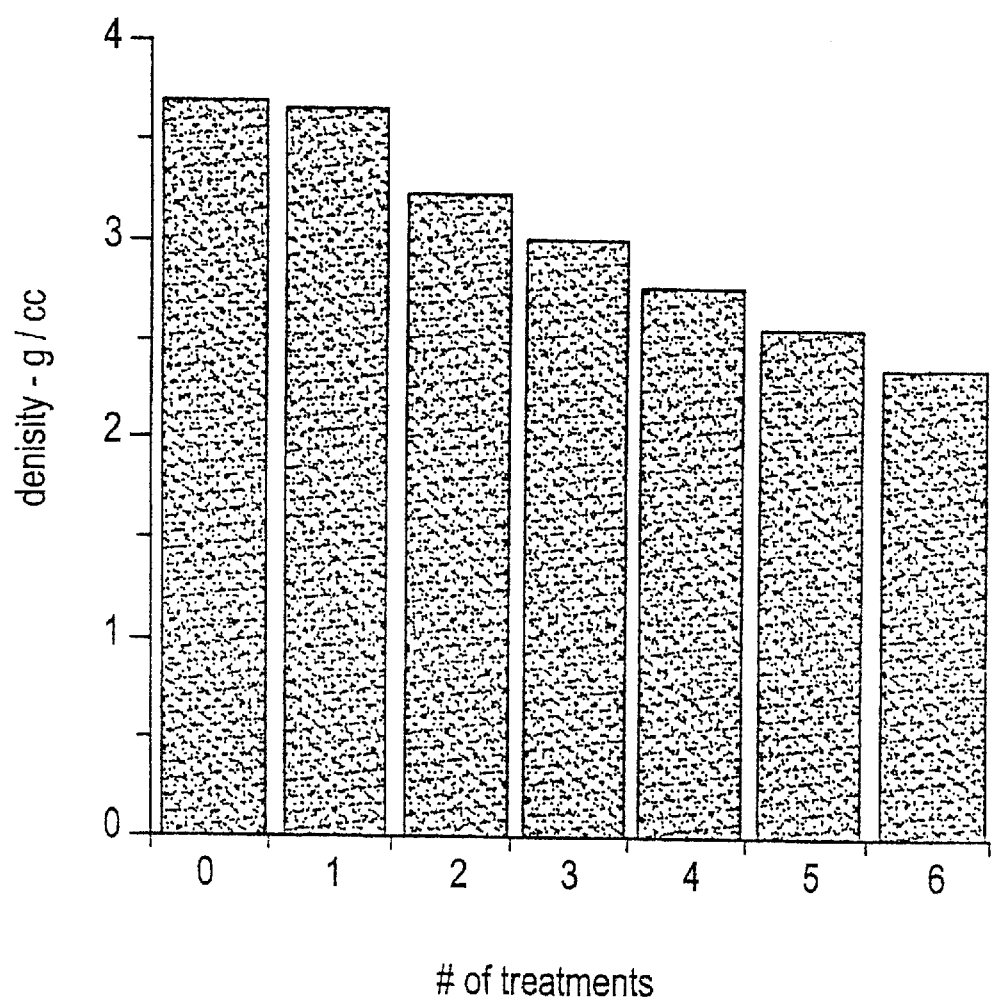
FIG. 2 is a graph illustrating the change in air-laid density of INCONEL® 625 powder as a function of the number of initial stage sintering/breaking cycles.

The air-laid density of this powder after six treatments was 2.38 g/cm$^3$. As shown in FIG. 1, the treatment results in a much broader size distribution, shifted toward larger sizes, than was present in the starting material. The distribution ranges from less than 5 μm to greater than 30 μm with the greatest proportion falling between 5 and 20 μm. FIG. 2 shows how the air-laid density of the powder changes with additional treatment cycles. There is a monotonic decrease in air-laid density with increasing number of treatments. This indicates that the powder particle morphology becomes more irregular with each treatment.

Figure 3A:
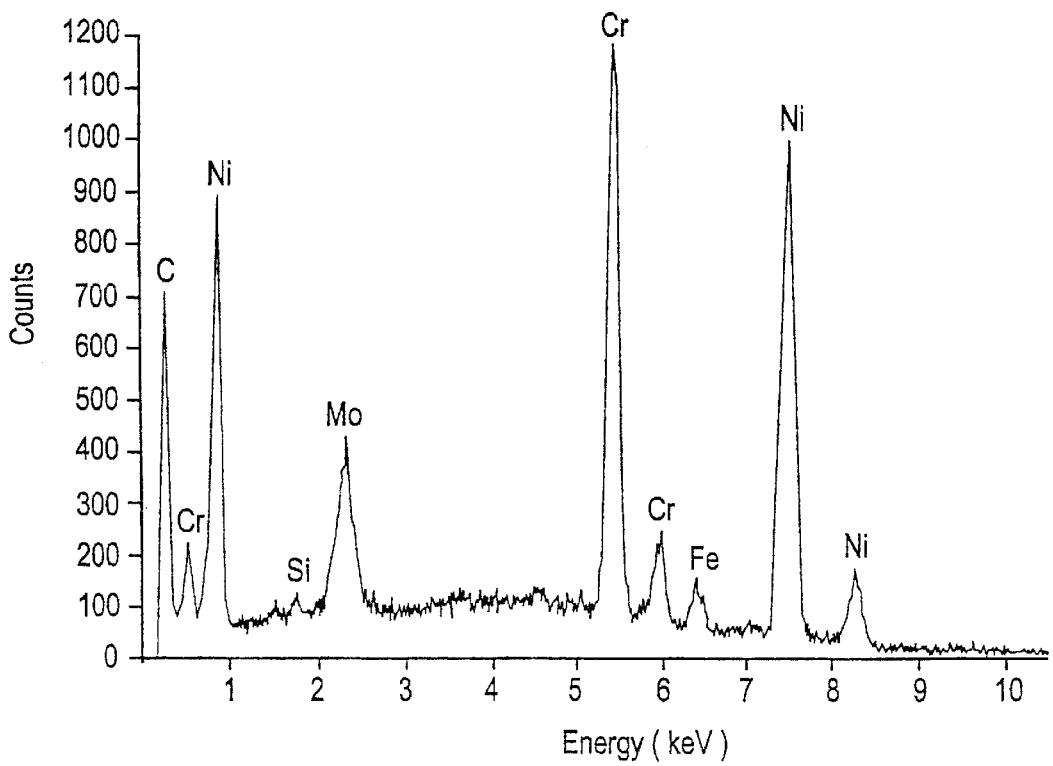
FIG. 3A is an energy dispersive x-ray fluorescence spectrum of untreated INCONEL® 625 powder.
Figure 3B:
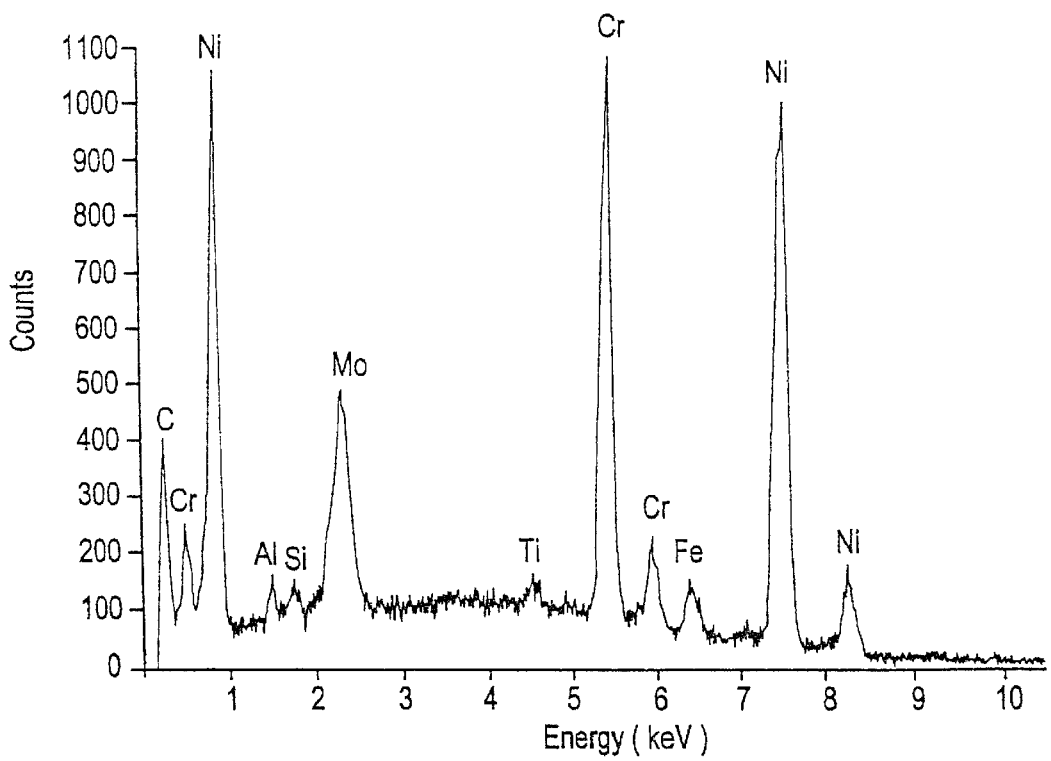
FIG. 3B is an energy dispersive x-ray fluorescence spectrum of INCONEL® 625 powder after six initial stage sintering/breaking cycles.

FIG. 3A and FIG. 3B show EDS spectra of INCONEL® 625 powder before and after six initial stage sintering/breaking cycles. No significant differences in elemental composition of the treated and untreated powders are noted.

A metal membrane filter element was fabricated from the treated INCONEL® 625 powder via the method disclosed in U.S. Pat. No. 5,487,771. As indicated above, the treated powder had an air-laid density of 2.38 g/cm$^3$. The green form produced by compressing this powder in a mold, had a density of 3.13 g/cm$^3$ (63% porous), and the final filter element, following sintering, had a density of 3.44 g/cm$^3$ (60% porous).

Example 2

Preparation of a Dendritic Stainless Steel Powder

Material 316L stainless steel powder (−10 μm cut) was obtained from Ametek (Ametek Specialty Metal Products Division, Eighty-four, Pa.). The powder, as received, had an air-laid density of 2.79 g/cm$^3$.

Method

The method described in Example 1 was followed with two exceptions. First, a 100 g sample of the 316L stainless steel starting material was used. Second, the temperature was ramped to a maximum temperature of 800° C., which was maintained for 30 minutes. The initial stage sintering/mechanical breaking procedure was performed a total of four times. A metal membrane filter element was fabricated from the resulting dendritic 316L stainless steel powder following the procedure disclosed in U.S. Pat. No. 5,487,771.

Results

FIG. 4 illustrates the changes in air-laid density of the 316L stainless steel powder accompanying a series of initial stage sintering/breaking cycles. A monotonic decrease in density with an increasing number of cycles is observed. Following four treatment cycles the air-laid density was 1.54 g/cm$^3$.

Figure 5:
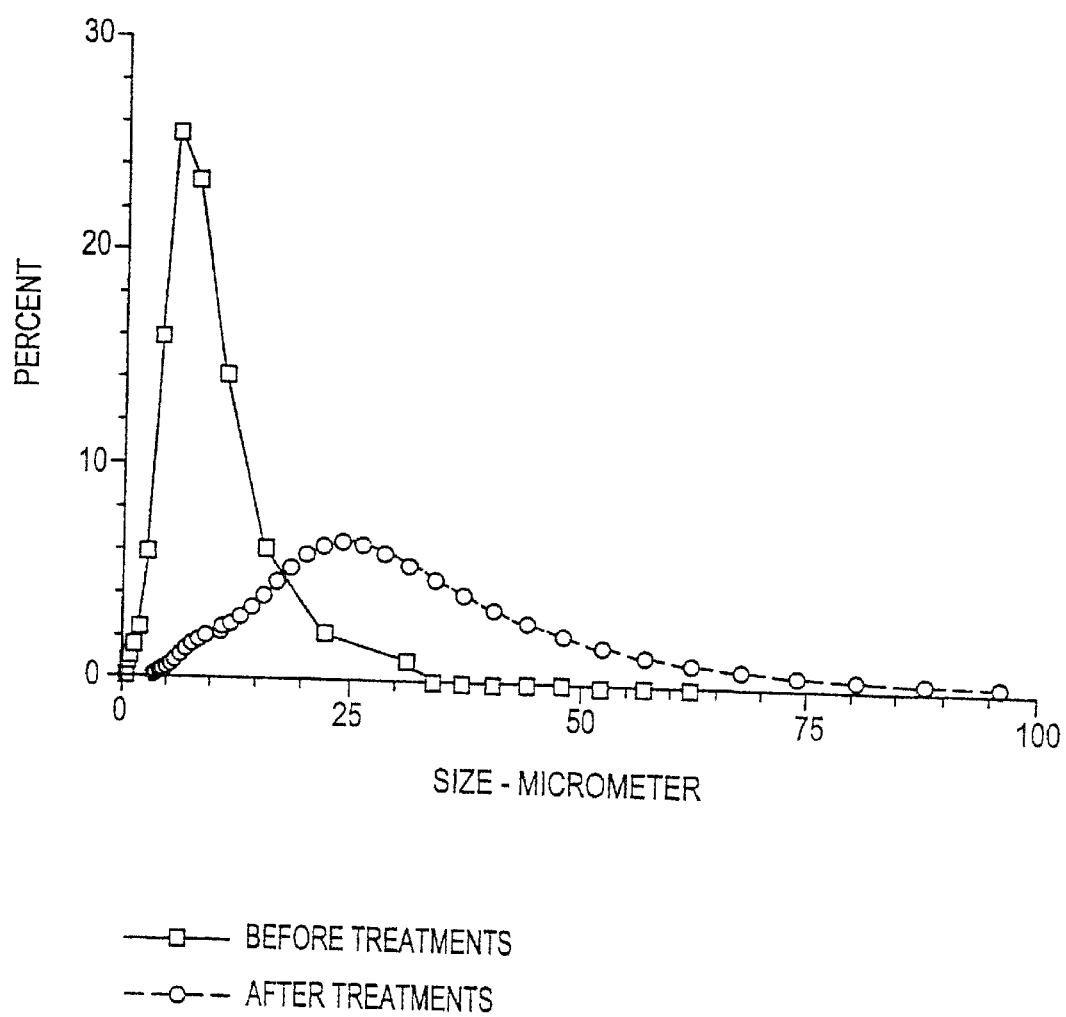
FIG. 5 is a graph comparing particle size distributions for untreated 316L stainless steel powder and 316L stainless steel powder treated with four initial stage sintering/breaking cycles.
Figure 6:
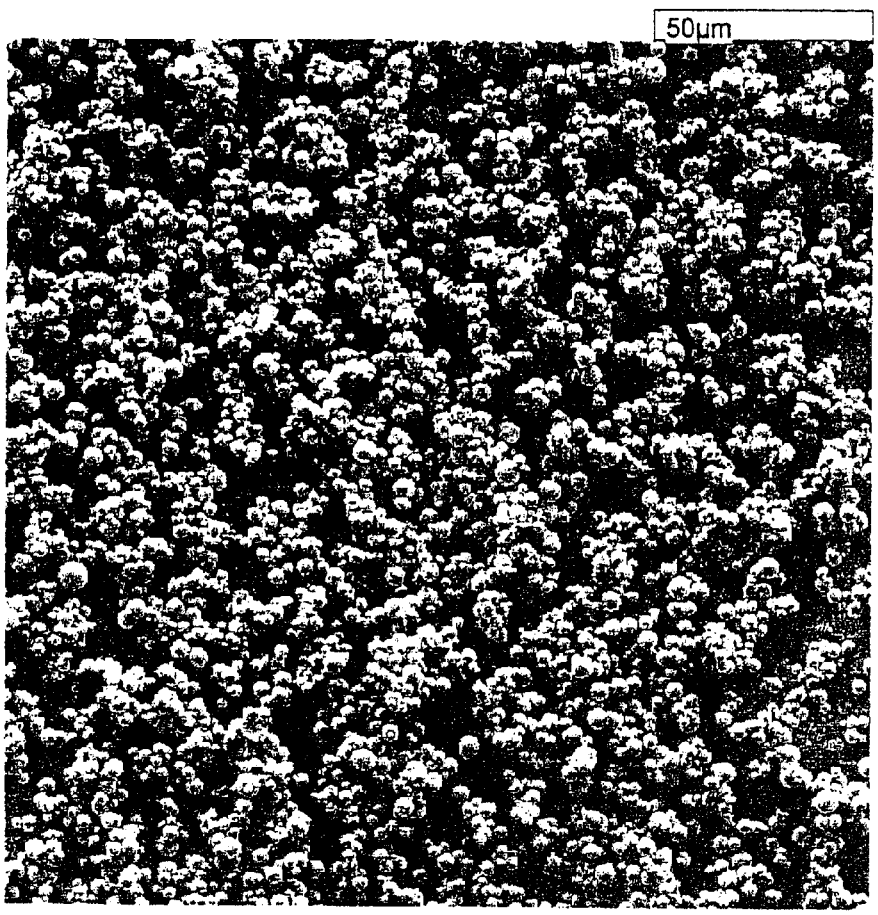
FIG. 6 is a scanning electron micrograph of the dendritic metal particles produced as described in Example 1.

FIG. 5 illustrates the change in particle size distribution following four initial stage sintering/breaking cycles. The starting powder has a relatively narrow size distribution, with the majority of particles within the 3 μm to 15 μm range. After four initial stage sintering/breaking cycles, however, the distribution is much broader, and shifted toward larger sizes, with the majority of particles now of size greater than 20 μm.

The metal membrane filter element produced from the dendritic 316L stainless steel powder was 3.13 g/cm$^3$ (61% porous), while the density of the compacted green form was 2.83 g/cm$^3$ (65% porous).

Equivalents

Those skilled in the art will recognize or be able to ascertain using no more than routine experimentation many equivalents to the specific embodiments of the invention described herein. Such equivalents are intended to be encompassed in the scope of the following claims.

What is claimed is:

1. A powder comprising anisotropic chromium-containing particles, wherein said powder is produced by a method comprising the steps of:

(a) heating a starting chromium-containing powder comprising non-dendritic particles under conditions suitable for initial stage sintering, thereby forming a lightly sintered material; and (b) breaking the lightly sintered material, thereby forming a powder comprising anisotropic chromium-containing particles having irregular morphology, said particles comprising aggregated and fused non-dendritic chromium-containing particles and having an air-laid density which is lower than the air-laid density of said starting chromium-containing powder.

2. The powder of claim 1 wherein the starting chromium-containing powder comprises an alloy of chromium.

3. The powder of claim 2 wherein the starting chromium-containing powder consists essentially of chromium.

4. A metal powder comprising anisotropic chromium-containing particles having irregular morphology, said particles comprising aggregated and fused non-dendritic chromium-containing particles.

5. The powder of claim 4 wherein the chromium-containing particles comprise an alloy of chromium.

* * * * *